US007750898B2

(12) United States Patent
Welbers et al.

(10) Patent No.: US 7,750,898 B2
(45) Date of Patent: Jul. 6, 2010

(54) APPARATUS FOR DRIVING MATRIX-TYPE LCD PANELS AND A LIQUID CRYSTAL DISPLAY BASED THEREON

(75) Inventors: Antonius P. G. Welbers, Walde (CH); Francesco Maone, Zurich (CH)

(73) Assignee: Trident Microsytems (Far East) Ltd., Grand Cayman (KY)

(*) Notice: Subject to any disclaimer, the term of this patent is extended or adjusted under 35 U.S.C. 154(b) by 598 days.

(21) Appl. No.: 11/575,064

(22) PCT Filed: Sep. 8, 2005

(86) PCT No.: PCT/IB2005/052943

§ 371 (c)(1), (2), (4) Date: Mar. 9, 2007

(87) PCT Pub. No.: WO2006/027754

PCT Pub. Date: Mar. 16, 2006

(65) Prior Publication Data

US 2008/0018639 A1 Jan. 24, 2008

(30) Foreign Application Priority Data

Sep. 10, 2004 (EP) .................................... 0420051

(51) Int. Cl.
*G06F 3/038* (2006.01)

(52) U.S. Cl. ....................................... 345/204; 345/100

(58) Field of Classification Search ....................... None
See application file for complete search history.

(56) References Cited

U.S. PATENT DOCUMENTS

| | | | | |
|---|---|---|---|---|
| 5,534,889 | A * | 7/1996 | Reents et al. | 345/89 |
| 6,236,347 | B1 * | 5/2001 | Cheng | 341/145 |
| 2002/0089473 | A1 * | 7/2002 | Yamazaki et al. | 345/75.2 |
| 2003/0112215 | A1 * | 6/2003 | Hector et al. | 345/98 |
| 2005/0078127 | A1 * | 4/2005 | Kim | 345/690 |

FOREIGN PATENT DOCUMENTS

KR 1020050034502 * 4/2005

OTHER PUBLICATIONS

Machine translation of KR1020050034502.*

* cited by examiner

*Primary Examiner*—Amare Mengistu
*Assistant Examiner*—Antonio Xavier
(74) *Attorney, Agent, or Firm*—DLA Piper LLP (US)

(57) ABSTRACT

Apparatus (40) comprising a plurality of output buffers (41.1-41.N) for driving the columns of an LCD panel (46). A bias generator (42) is employed for providing a common biasing current ($I_{bias}$) to all output buffers (41.1-41.N). Means (43) provide information regarding the physical position of a dot to be driven on the LCD panel (46) by counting the number of incoming load signals (LD). A switchable current source (42) changes the level of the biasing current ($I_{bias}$) according to the physical position.

11 Claims, 6 Drawing Sheets

APPARATUS FOR DRIVING MATRIX-TYPE LCD PANELS AND A LIQUID CRYSTAL DISPLAY BASED THEREON

FIELD OF THE INVENTION

The present invention concerns an apparatus for driving matrix-type LCD panels and a liquid crystal display.

BACKGROUND OF THE INVENTION

FIG. 1 shows a block diagram of a conventional display module 10. Details of the electrical configuration for driving a simple matrix type liquid crystal panel 16 are illustrated. A plurality of segment electrodes (with N=384, for example) of the liquid crystal panel 16 are driven in parallel by a column driver bank 14 comprising an array of source drivers 14.1-14.$x$ (with x=8, for example), and a plurality of common electrodes are driven by a row driver array 15 while being selected sequentially. An interface is used as the interface between a host computer (not illustrated in FIG. 1) and the display module 10. The interface function 12 is typically realized at the input side of a display timing controller 13. The column driver bank 14 drives, as mentioned, the N columns of the LCD display 16 and it comprises N individual output buffers. Typically, each source driver 14.$x$ of the column driver bank 14 serves n column electrodes of the display panel 16 by providing analog output signals. The row driver array 15 comprises an array of row drivers. Each pixel of the display 16 is a switchable capacitor between a row and a column electrode. The display 16 may be a passive matrix LCD panel, for example.

Display data which represent an image to be displayed on the liquid crystal panel 16 are given to the column driver 14 as serial data by the timing controller 13. Additional signals CLKN, CLKP and LD typically are also supplied to the column driver bank 14 by the controller 13. The controller 13 also supplies signals to the row driver array 15. The row driver array 15 selects a common electrode which should display first in response to a vertical synchronization signal, and thereafter scans in the vertical direction by changing the common electrode to be selected successively while synchronizing with the horizontal synchronization signal.

FIG. 2 shows the internal configuration of the column driver bank 14 shown in FIG. 1. The display data supplied from the controller 13 as serial data IF[1:N] are fed via an input interface 27 and a serial-to-parallel converter 26 for conversion from serial data to parallel data into a data latch 22 according to a data latch clock. A bi-directional shift register 21 is provided in order to be able to switch the direction from which the data are to be displayed on the panel 16. After the data were latched in the data latch 22, they are latched in a line latch 23 at every horizontal scanning period according to a horizontal synchronization signal LD. The data latch 22 serves as "data buffer" for loading data while another data set is read from the line latch 23. The output of the line latch 23 is sent via a digital-to-analog converter 24 to a liquid crystal drive output circuit 25. The data are transferred to the outputs Y1 through Y480 (i.e. N=480 in the present example) by means of the horizontal synchronization signal LD, also referred to as load signal in order to drive the display panel 16. The LD pulse comes in only after a whole line of dots (several source drivers) is ready. The drive output circuit 25 in the present example is able to drive N=480 columns. It comprises N individual output buffers. In FIG. 2, the output buffer of the third column is designated with the reference number 31.

As the FIG. 3 shows, a column of the panel 16 can be regarded as a distributed RC-load. Each of the n rows is represented by an RC network. In FIG. 3 only the third column is depicted. Because in a conventional device the output buffer 31 is biased with a fixed current $I_{bias}$, the $1^{st}$ row settles much earlier than the $M^{th}$ row, as illustrated by means of two schematic U(t) timing diagrams.

In a conventional source driver 14, the output buffers 31 are designed such that the biasing current $I_{bias}$, is defined for the most far away row, that is for the $M^{th}$ row. As a consequence, those rows that are closer to the output buffer 31 see a biasing current $I_{bias}$, that is too high. In other words, theses rows are "overdriven".

In the U.S. patent application published under US 2003/0112215 A1, a liquid crystal display and driver are described where a timing circuitry is provided that divides each row period into a drive period and a voltage maintenance period. During the driver period the output buffers use a higher biasing current in order to charge the column lines of the display panel. During the maintenance period, a lower biasing current is used to maintain the voltage on the column lines. This solution does, however, not address the problem described above where certain rows are driven with currents that are too high.

Thus, it would be generally desirable to reduce the power required to be drawn by the buffers.

It is thus an object of the present invention to provide a solution that takes into account the distance of the individual rows.

It is a further objective of the present invention to provide a concept for reducing the power consumption of an LCD driver.

It is a further objective of the present invention to improve conventional LCD drivers and to reduce their current consumption.

SUMMARY OF THE INVENTION

These disadvantages of known systems, as described above, are reduced or removed with the invention as described and claimed herein.

An apparatus in accordance with the present invention is claimed in claim 1. Various advantageous embodiments are claimed in claims 2 through 8.

A liquid crystal display in accordance with the present invention is claimed in claim 9 and advantageous embodiments are claimed in claims 10 and 11.

An apparatus according to the present invention comprises output buffers for driving the columns of an LCD panel. A bias generator is employed that provides a common biasing current to all output buffers. The apparatus further comprises means for providing information regarding the physical position of a dot to be driven on the LCD panel. According to the present invention, this information is obtained by counting the number of incoming load signals (LD). A switchable current source is employed that allows the level of the biasing current to be changed according to the physical position.

According to the present invention, a liquid crystal display is proposed that comprises a plurality of liquid crystal pixel electrodes arranged as an array of rows and columns. There is a plurality of row and column lines for driving the liquid crystal pixel electrodes, and a plurality of output buffers for driving the plurality of column lines. All output buffers are operable at a common biasing current. Special means for varying the common biasing current are provided, whereby the biasing current depends on the physical distance between the output buffers and the row to be driven.

By varying the common biasing current of all output buffers row period-by-row period, it is possible to reduce the power consumption of the source driver, whilst still providing sufficient current to switch the column lines in the time available.

It is an advantage of the present invention that it can be used for driving any kind of LCD display, such as a TFT display, or an OLED (organic light emitting display), for example. Additional features and advantages of the invention will be set forth in the description that follows, and in part will be apparent from the description.

BRIEF DESCRIPTION OF THE DRAWINGS

For a more complete description of the present invention and for further objects and advantages thereof, reference is made to the following description, taken in conjunction with the accompanying drawings, in which.

DESCRIPTION OF PREFERRED EMBODIMENTS

Figure 4A:
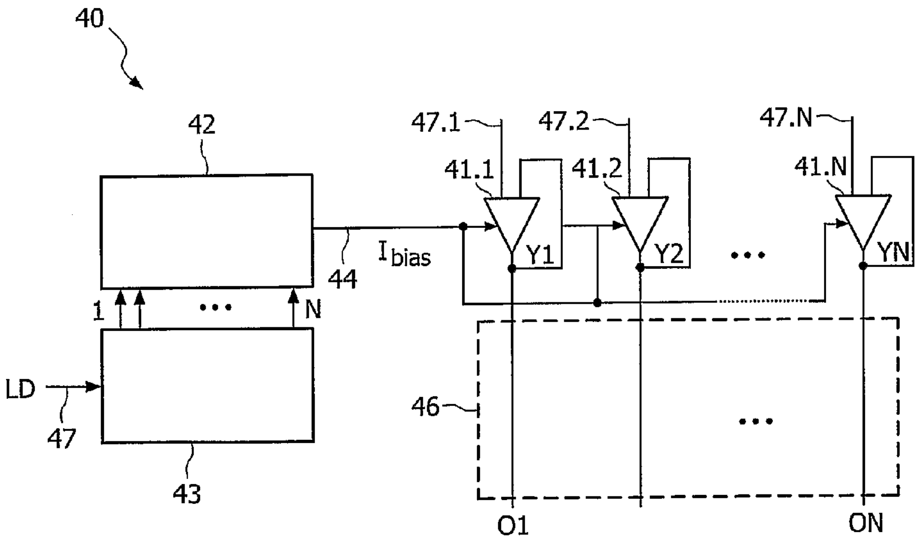
FIG. 4*a* shows a schematic block diagram of a first apparatus, according to the present invention.

FIG. 4 presents the most basic schematic of a device 40 according to the present invention. The device 40 comprises a plurality of output buffers 41.1 through 41.N for driving the N columns (01 through ON) of an LCD panel 46, as schematically depicted in FIG. 4. A switchable current source 42 provides a common biasing current $I_{bias}$ to all output buffers 41.1 through 41.N. The device 40 comprises a bias line 44 that is connected to all output buffers 41.1 through 41.N. The device 40 further more comprises means 43 for providing information regarding the physical position of a dot (respectively a row) to be driven on the LCD panel 46. According to the present invention, information about the row that is to be driven during the next step is obtained by counting the number of incoming load signals LD. For this reason, the means 43 comprise an LD input 47. Each output buffer 41.1 through 41.N has a data input 47.1 through 47.N and an output Y1 through YN.

The means 43 may comprise a counter that counts the LD signals. The counter 43 may comprise a series of flip-flops. A signal at the output of the last flip-flop in this series may be used to reset the counter. In order to ensure that the counter is properly initiated after power-on, an external reset may be provided. The counter 43 issues a digital signal that represents the number of the row that is to be driven next. In the present example, the digital signal has N digits.

According to the present invention, the switchable current source 42 changes the level of the biasing current $I_{bias}$ according to the physical position. Since the physical position is represented by a corresponding digital signal provided by the counter 43, the switchable current source 42 comprises a number of digitally controlled switches. Depending on the digital signal, these switches provide a contribution to the biasing current $I_{bias}$.

Figure 5:
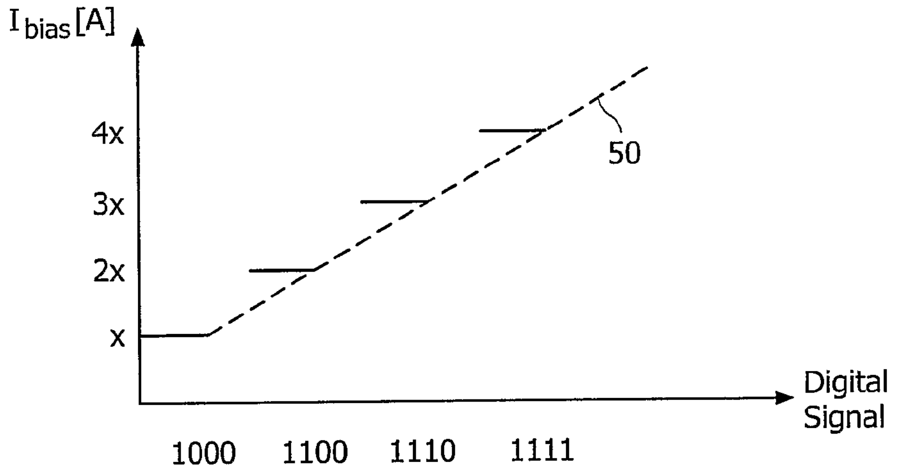
FIG. 5 shows the biasing current depending on digital signals, according to the present invention.

The means 43 and the switchable current source 42 can be realized in different ways. For the sake of simplicity, in the following an embodiment is described where the switchable current source 42 comprise M switches (each being formed by a pair of MOSFET transistors, for example) and where each of these switches contributes to the biasing current $I_{bias}$ only if the respective digit of the digital signal shows a logic "1". If all switches are identical, one can obtain a biasing current $I_{bias}$ as illustrated in FIG. 5. In this particular example, there are only four switches and four different bias current levels. If a digital signal "1000" is applied to the switchable current source 42, only the first switch contributes to the biasing current $I_{bias}$. The biasing current $I_{bias1}$ is x. If the digital signal is "1100", the resulting biasing current $I_{bias2}$ is 2x, and so forth.

It is obvious that this is just one possible embodiment where the biasing current $I_{bias}$ varies step-by-step and the slope is linear, as illustrated by means of the line 50 in FIG. 5. One may implement other curves depending on the design of the liquid crystal display. Also the coding scheme used to set the switches of the switchable current source 42 may vary.

It should be noted that the buffer biasing current is not the complete current drawn by the output buffers, which generally is drawn from a power supply. This power supply is not shown in any of the Figures.

According to another embodiment, the number of current steps is reduced. If two adjacent rows are driven with the same biasing current $I_{bias}$, one needs just M/2 different current steps. In this case, the first and second rows are both driven with the biasing current $I_{bias}$. The third and fourth rows are driven with a biasing current $I_{bias2}$, and so forth. This approach allows to reduce the number of transistor pairs inside the switchable current source 42 needed to provide the biasing current. If the LCD panel has M=1200 rows (in case of an UXGA panel), one would need 600 transistor pairs rather than 1200 transistor pairs.

It is also possible to further reduce the number of transistor pairs needed by forming groups each comprising q rows. If the LCD panel has M rows, this approach would required M/q transistor pairs. Assuming that the LCD panel has M=1200 rows and that q=10, one would need 120 transistor pairs only.

Figure 6:
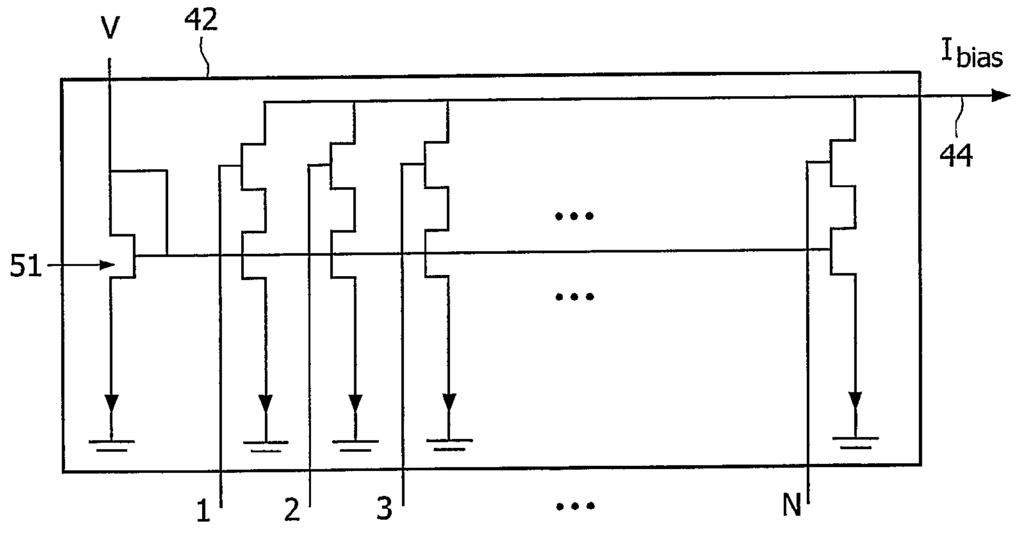
FIG. 6 shows a schematic block diagram of a switchable current source, according to the present invention.

One possible embodiment of the switchable current source 42 is given in FIG. 6. As illustrated in this Figure, the current source 42 comprises a network of MOSFET transistors. The network comprises a first MOSFET transistor 51 that provides a pre-defined reference current and M MOSFET pairs, as illustrated in FIG. 6. Depending on the digital signal applied to the inputs 1 through N, small amounts of currents are added to the reference current. The resulting biasing current $I_{bias}$ is made available at an output 44.

A transistor serving as dummy switch may be positioned between the first MOSFET transistor 51 and the positive voltage node V. Such a dummy switch, if always in an on-state, may be employed for matching reasons. Note that this dummy switch is optional, however.

Figure 7:
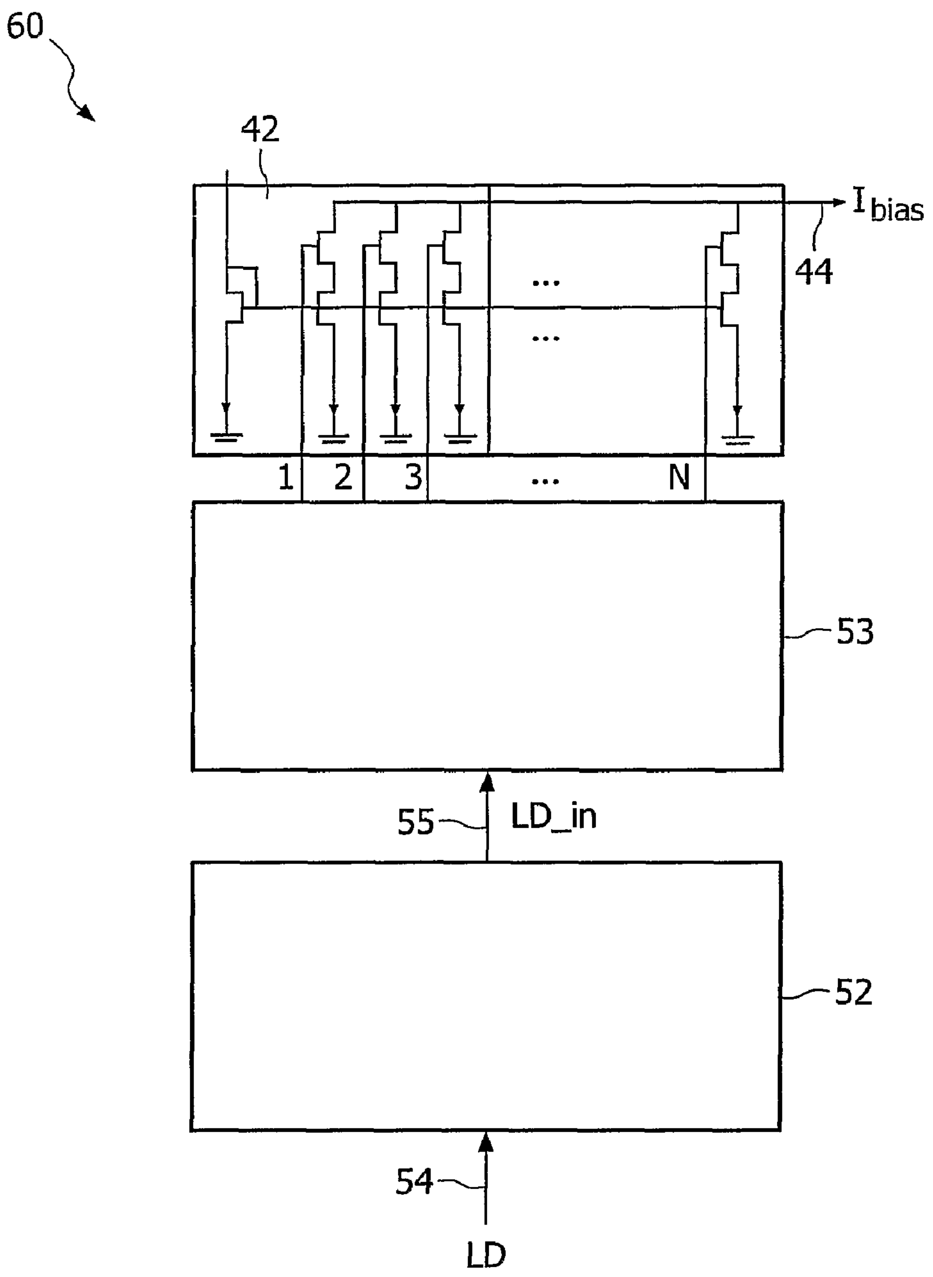
FIG. 7 shows a schematic block diagram of another apparatus, according to the present invention.

Yet another embodiment is illustrated in FIG. 7. In this Figure a device 60 is shown that comprises a switchable current source 42 (e.g. similar to the one shown in FIG. 6), a counter 53 and a prescaler 52. The prescaler 52 receives the load signal LD at the input 54, as indicated. The prescaler 52 issues a LD_in pulse for each M/q pulses LD at the input 55. The LD_in pulse is applied to the counter 53. The digital output signals I through N at the output side of the counter 53 respect a certain predefined waveform.

The prescaler 52 provides for a bias resolution of a factor q. If there are M rows, the bias resolution would be q/M.

Using the current source 42 being based on the mirroring principle of a well defined reference current, as described in connection with FIG. 6, the MOSFET pairs serve as switches that add a current contribution to the resulting biasing current $I_{bias}$. The resulting biasing current $I_{bias}$ is provided at an output 44. The prescaler 52 may be employed to reduce the number of the resulting biasing current bias steps, for instance.

As a result, one obtains a device where all buffers are biased stronger as the row index increases, that is the biasing current increases with each row period, or if several rows from a group, the biasing current increases with each row group. Due to this, it is possible to ensure that the settle time for each pixel of the row is kept rather constant even if i (with $0<i\leqq M$) is increasing.

According to the present invention, the biasing current is varying according to the number of load signals LD. It is clear from the above that the power consumption can be quite low since the present invention allows each row to be driven with an appropriate (sufficient) current. It is not necessary anymore to drive the rows with currents that are too high.

Figure 1:
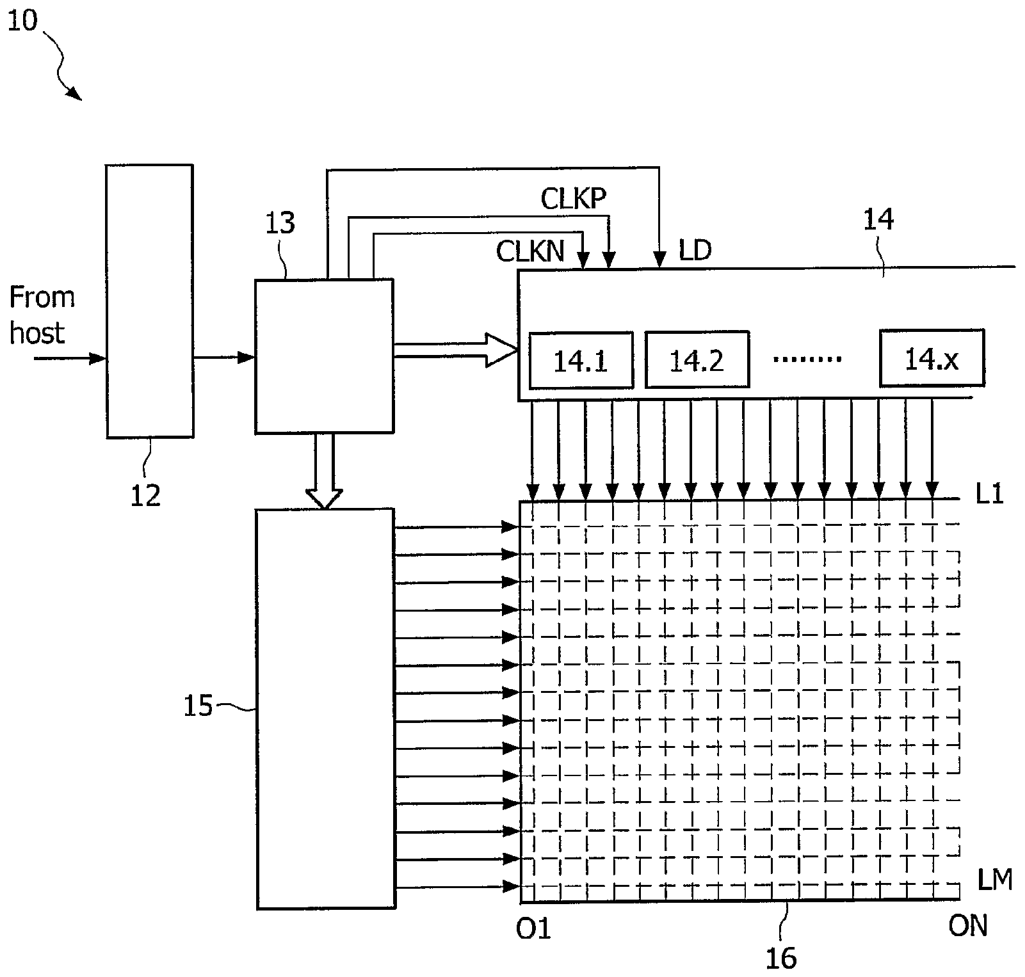
FIG. 1 shows a schematic block diagram of a conventional LCD display.
Figure 8:
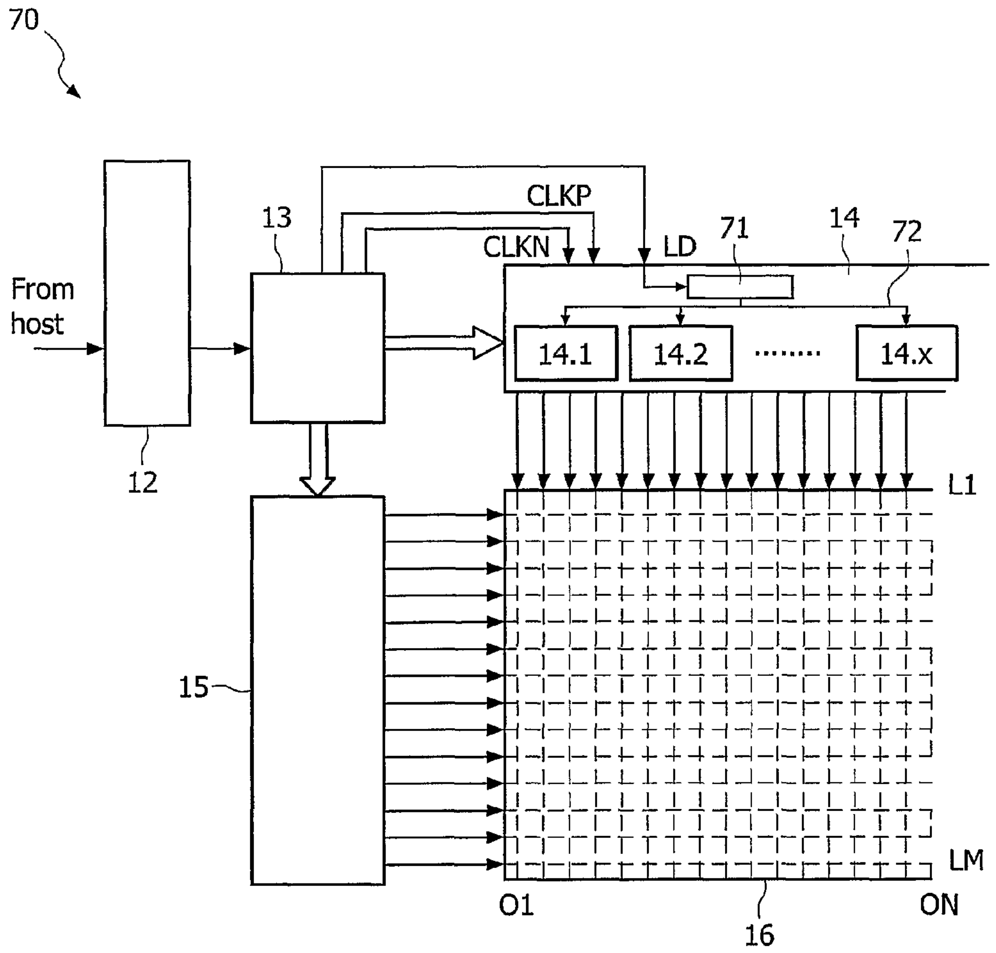
FIG. 8 shows a schematic block diagram of a LCD display, according to the present invention.

A liquid crystal display 70, according to the present invention is shown in FIG. 8. Details of FIG. 8 have already been discussed in connection with FIG. 1. In the following, only those aspects of the liquid crystal display 70 are addressed that have to be changed in order to arrive at the present invention. The liquid crystal display 70 comprises a plurality of liquid crystal pixel electrodes arranged as an array of rows (L1-LM) and columns (O1-ON). There is a plurality of row and column lines for driving the liquid crystal pixel electrodes. A plurality of output buffers is provided for driving the plurality of column lines (O1-ON). The output buffers sit inside the source drivers 14.1-14.*x*. According to the present invention, all output buffers are operable at a common biasing current $I_{bias}$. This biasing current $I_{bias}$ is applied via a common current line 72 to the source drivers 14.1-14.*x* and the output buffers inside. There are means 71 for varying the common biasing current $I_{bias}$ depending on the physical distance between the output buffers and the row to be driven. The means 71 process the load signal LD, or a corresponding signal, in order to obtain information about the actual row index.

Figure 2:
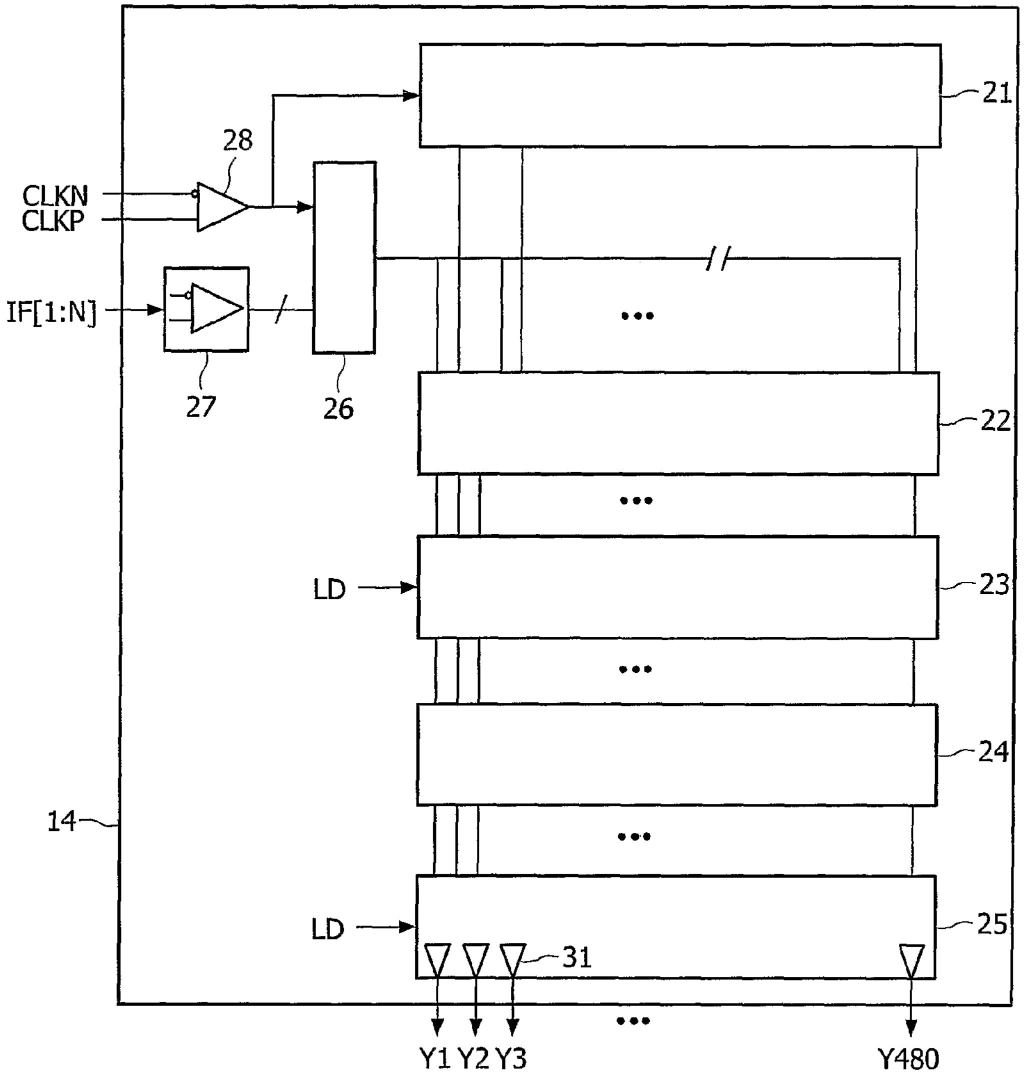
FIG. 2 shows a schematic block diagram of a conventional source driver.
Figure 3:
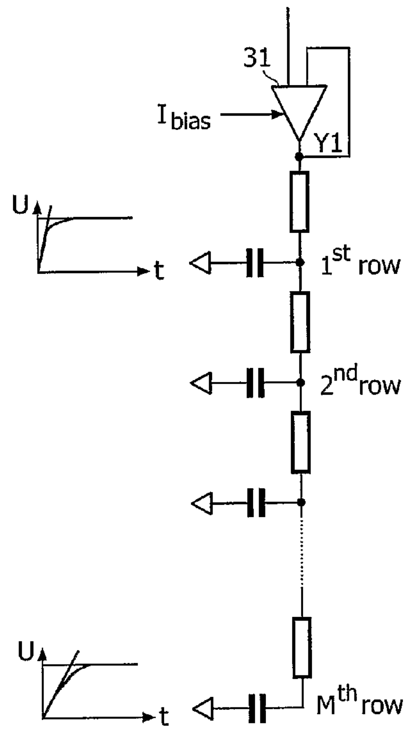
FIG. 3 shows a schematic block diagram of one column and a plurality of rows of a conventional display panel.

In a preferred embodiment, the output buffers of liquid crystal display 70 have signal inputs and outputs. The outputs (Y1-YN) are connected to drive a respective column line and the signal input is connected to a digital-to-analogue conversion means (e.g. digital-to-analogue conversion means 24 in FIG. 2).

The invention presented in the U.S. patent application published under US 2003/0112215 A1, may be combined with the teaching of the present invention. This allows to realize a device where the physical location of the row has an impact on the biasing current. At the same time, the biasing current may be reduced after the drive period to a lower biasing current that is sufficient to maintain the voltage on the column lines.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable subcombination.

In the drawings and specification there has been set forth preferred embodiments of the invention and, although specific terms are used, the description thus given uses terminology in a generic and descriptive sense only and not for purposes of limitation.

The invention claimed is:

1. Apparatus comprising:

a plurality of output buffers for driving the columns of an LCD panel;

a bias generator providing a common biasing current ($I_{bias}$) to all of said output buffers;

means for providing information regarding the physical position of a dot to be driven on the LCD panel by counting the number of incoming load signals; and a switchable current source for changing the level of the biasing current ($I_{bias}$) according to the physical position such that only a first level of the biasing current ($I_{bias}$) is provided to the output buffers when the dot is at a particular physical position and only a second level of the biasing current ($I_{bias}$) is provided to the output buffers when the dot is at another physical position that is further away from the output buffers than the particular physical position, the second level of the biasing current ($I_{bias}$) being higher than the first level of the biasing current ($I_{bias}$).

2. The apparatus of claim 1, wherein the switchable current source provides the biasing current ($I_{bias}$) that is proportional to a physical distance between the output buffers and the dot to be driven.

3. The apparatus of claim 1, wherein the switchable current source is based on the mirroring principle of a reference current.

4. The apparatus of claim 1, wherein the switchable current source comprises a plurality of switches, whereby each of said switches adds a current contribution to the biasing current ($I_{bias}$), said switches being activated by said means for providing information.

5. The apparatus of one of claim 1, wherein the means for providing information comprise a counter for counting the incoming load signals.

6. The apparatus of claim 5, wherein the means for providing information further comprise a prescaler.

7. The apparatus of claim 1, wherein the output buffers provide output signals being the same for any dot at any physical position on the LCD panel.

8. The apparatus of one of claim 1, wherein the biasing current ($I_{bias}$) is made dependent on the physical distance between the output buffers and the row being driven in order to reduce the slew rate when driving those rows that have a small physical distance.

9. A liquid crystal display comprising:

a plurality of liquid crystal pixel electrodes arranged as an array of rows and columns, a plurality of row and column lines for driving the liquid crystal pixel electrodes, a plurality of output buffers for driving the plurality of column lines, all output buffers being operable at a common biasing current ($I_{bias}$), and means for varying the common biasing current ($I_{bias}$) depending on the physical distance between the output buffers and the row to be driven such that only a first level of the biasing current ($I_{bias}$) is provided to the output buffers for a first row at a particular distance from the output buffers and only a second level of the biasing current ($I_{bias}$) is provided to the output buffers for a second row at another distance from the output buffers that is greater than the particular distance, the second level of the biasing current ($I_{bias}$) being higher than the first level of the biasing current ($I_{bias}$).

10. The liquid crystal display of claim 9, wherein the means for varying the common biasing current ($I_{bias}$) comprise a switchable current source for changing the level of the biasing current ($I_{bias}$) according to the physical position.

11. The liquid crystal display according to claim 9, wherein each output buffer has a signal input and output, the output being connected to drive a respective column line and the signal input being connected to a digital to analogue conversion means.

* * * * *